July 12, 1927.
E. R. BURTNETT
1,635,533
INTERNAL COMBUSTION ENGINE
Filed March 13, 1926    3 Sheets-Sheet 1
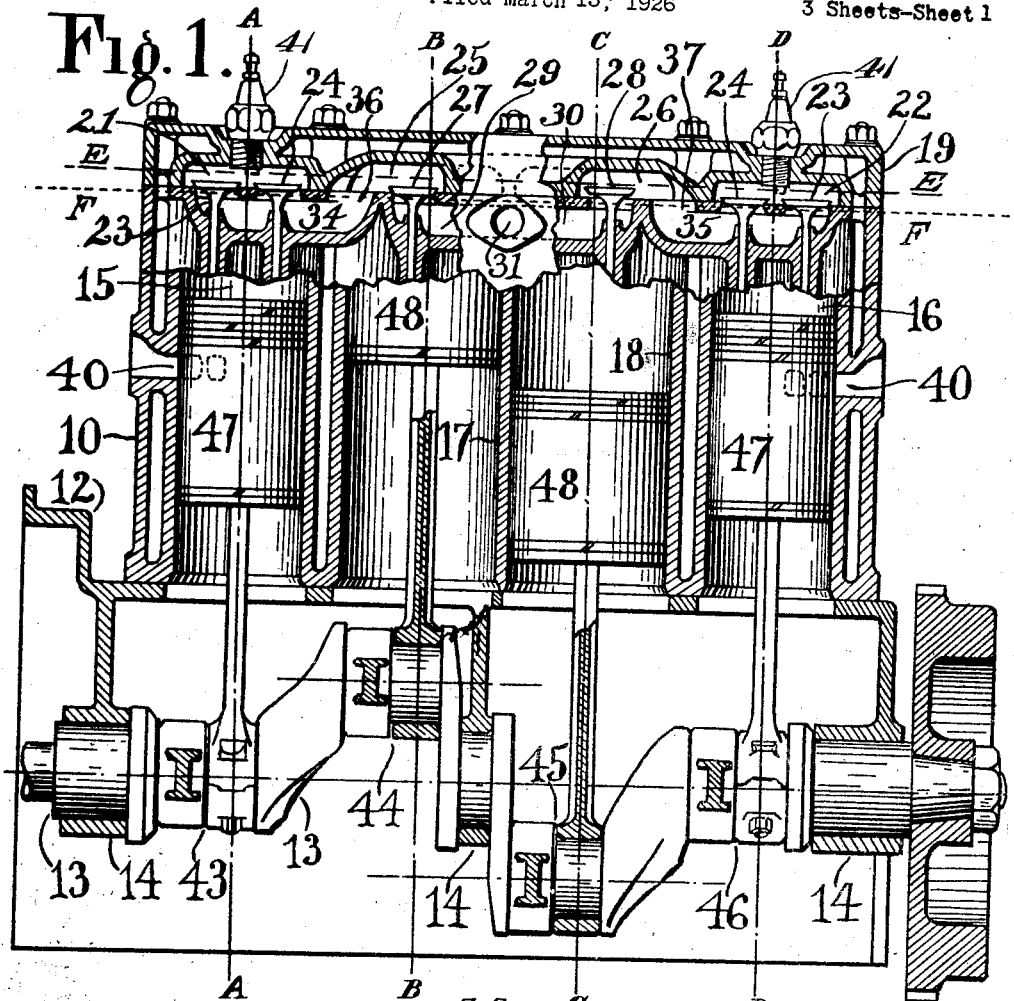
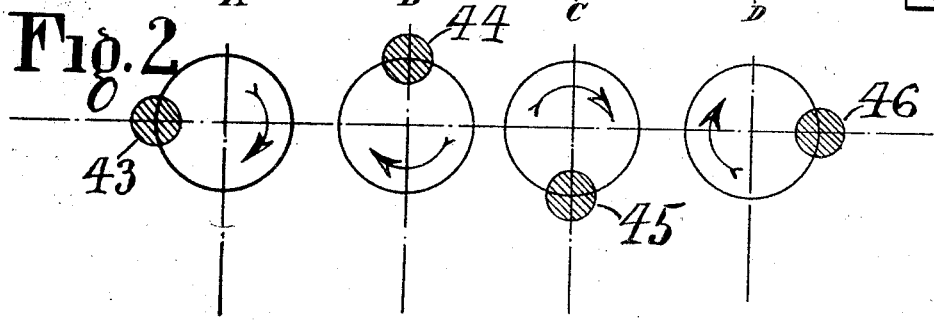
INVENTOR
Everett R. Burtnett July 12, 1927.
E. R. BURTNETT
1,635,533
INTERNAL COMBUSTION ENGINE
Filed March 13, 1926   3 Sheets-Sheet 2
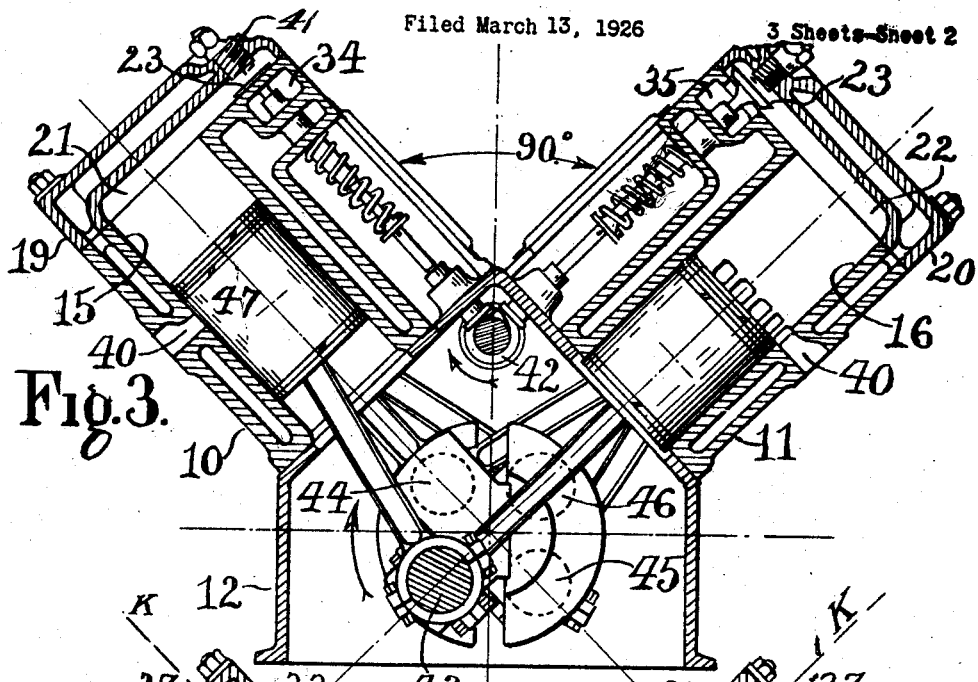
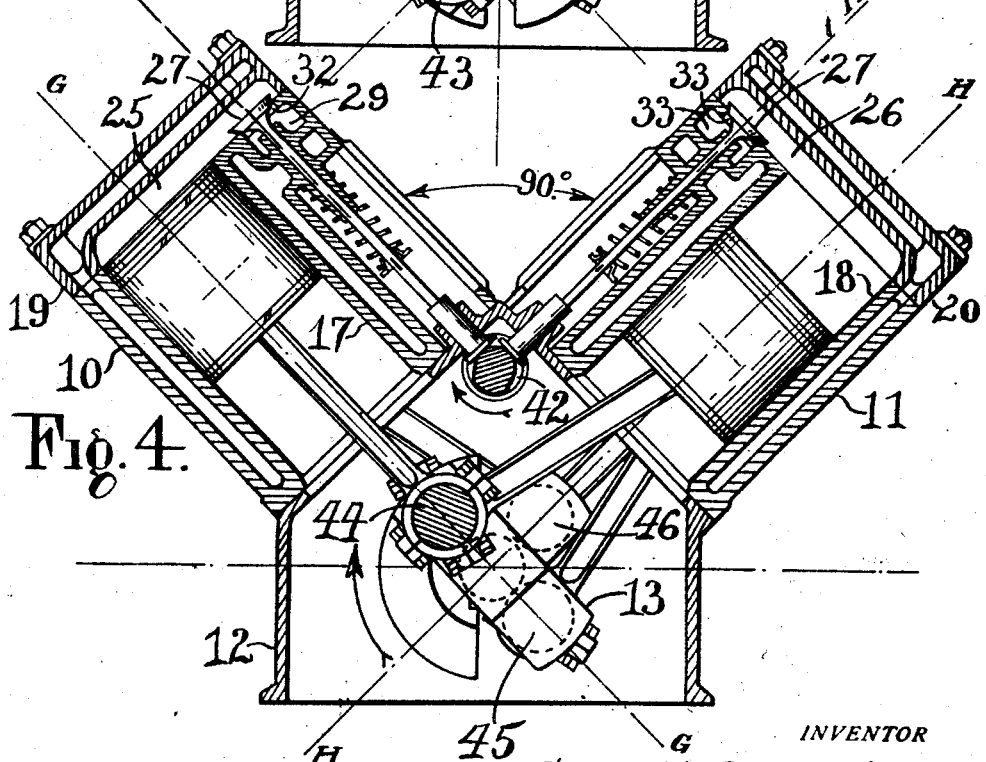
INVENTOR
Everett R. Burtnett

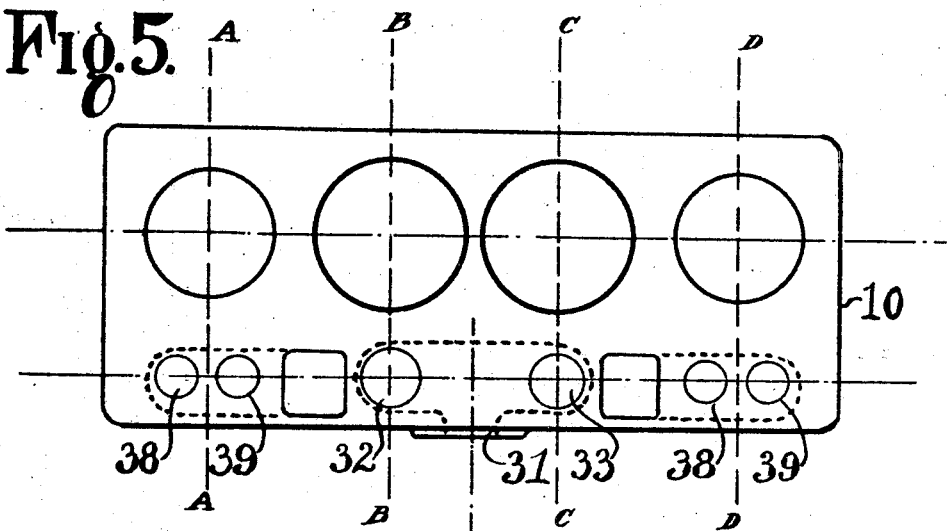
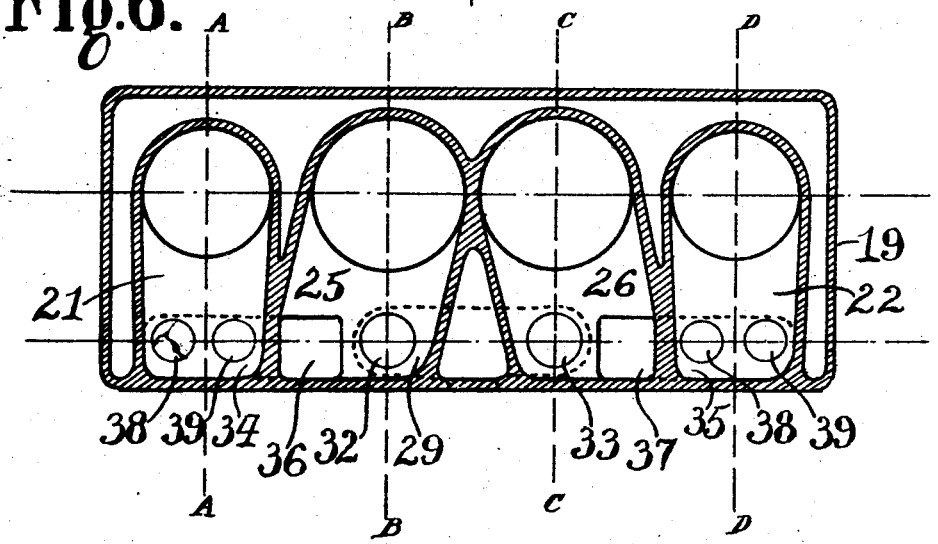

Patented July 12, 1927.

1,635,533

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA.

INTERNAL-COMBUSTION ENGINE.

Application filed March 13, 1926. Serial No. 94,367.

My invention relates to internal combustion engines of the two stroke cycle type, wherein both poppet valves and cylinder ports are employed, the poppet valves being used for cool gases only and the cylinder ports for the exhaust function, the principal objects being, first to provide a two stroke cycle internal combustion engine of four combination charge pumping and combustion units, developing four power impulses by each one revolution of the crankshaft, by the use of four charge pumping cylinders and four combustion cylinders, a piston within each of the four charge pump and the four combustion cylinders and a four crank pin crankshaft, and to arrange the cylinders as two rows of four cylinders each, disposed 90° apart in V formation, with two cylinders of each four cylinders comprising a row, being adapted to charge pumping and the other two cylinders of each four cylinder row being adapted to combustion, to arrange the charge pump and combustion cylinders of each row, so that each charge pump cylinder is adjacent a combustion cylinder and to form a duct communication between the chambers of each pair of adjacent charge pump and combustion cylinders, providing thereby very short fresh charge transfer passages.

A further object is to arrange the four crank pins of the crankshaft at four equal points of the circle of revolution, at 90° positions with the two end crank pins relatively 180° apart and the two center crank pins relatively 180° apart, with the second crank pins from each end of the crankshaft relatively 90° apart with respect to the positions of the first crank pins from each end and to attach two pistons to each of the four crank pins, one from each 90° V disposed row of four cylinders, the two pistons connected to each crank pin being both of either charge pumping or combustion cylinders, for the purpose of dividing the reciprocating forces of both the charge pumping and combustion cylinders in a manner which will permit balancing of the rotary and reciprocating forces, with counter weights attached to the shaft, the four charge pump and four combustion cylinders being functionally related and the pistons within the four charge pump and four combustion cylinders being arranged to develop a power impulse each 90° of the crankshaft rotation.

To provide a 90° V eight cylinder two stroke cycle engine of four combustion cylinders and four charge pumping cylinders, in which poppet valves are employed for inlet valve function to the charge pumping cylinders and admission to the combustion cylinders, with exhaust ports formed in the walls of each combustion cylinder for the release of the spent products of combustion from the combustion chambers, in combination with a four crank pin crankshaft with the four crank pins of the crank shaft arranged and the charge pump and combustion cylinder pistons attached thereto, so as to cause the piston of a functionally related charge pump cylinder to reach head end dead center, when the piston within the adjacent and functionally related combustion cylinder is approximately one-half way through the headward moving stroke, to facilitate supercharging of the combustion chambers with fresh charge.

With the foregoing and other objects in view my invention consists of certain novel features of construction and arrangement of parts that will be hereinafter more fully described and claimed and illustrated in the accompanying drawings in which:

Fig. 1 is a longitudinal section taken through one row of four cylinders of my improved two stroke cycle 90° V internal combustion engine, the head end being a section taken on the line "K" of either of the two duplicate cylinder banks as shown in Fig. 4, the lower part of the block and crank is a section taken through the center of the four cylinders of either duplicate bank of cylinders as indicated by the lines "G—G" or "H—H" of Fig. 4.

Fig. 2 is a diagrammatic view that graphically illustrates the relative positions of the four crank pins of the crankshaft of my improved eight cylinder 90° V two stroke cycle internal combustion engine as taken endwise of the crankshaft, from the end shown in Fig. 1 without a flywheel and the clockwise rotative movement being indicated by the arrows.

Fig. 3 is a vertical cross section taken through the center of a pair of V arranged combustion cylinders, in the rotary plane of the first crank pin from a given end as indicated by the line "A—A" in Fig. 1, the structure in the plane of rotation of the first crank pin from the opposite end is of duplicate form, being the second pair of V arranged combustion cylinders as indicated by line "D—D" in Fig. 1.

Fig. 4 is a vertical cross section taken through the center of a pair of V arranged charge pumping cylinders, in the rotary plane of the second crank pin from a given end as indicated by the line "B—B" in Fig. 1, the structure in the plane of rotation of the second crank pin from the opposite end (being the adjacent center crank pin) is of duplicate form, being the second pair of V arranged charge pumping cylinders as indicated by line "C—C" in Fig. 1.

Fig. 5 is a horizontal plan view of one bank of four cylinders taken on the line "F—F" of Fig. 1, showing the valve ports through the face of the cylinder block to which the cylinder head is attached and the inlet and transfer ducts are shown by dotted lines.

Fig. 6 is a horizontal section taken on the line "E—E" of Fig. 1.

Referring by numerals to the accompanying drawings which illustrate a practical embodiment of my invention "10" and "11" designate cylinder blocks that are arranged 90° apart so as to produce a V structure. The blocks may be cast integral with each other forming also a part of the crank case or separately formed and assembled. A crank case "12" is suitably formed to accommodate the two 90° disposed cylinder banks, a crankshaft "13" is suitably journaled by main bearings "14" in the crank case.

Formed in the blocks "10" and "11" adjacent to its ends are combustion cylinders "15" and "16" and formed in the said blocks between the combustion cylinders are two charge pumping cylinders, "17" and "18."

The axes of the two combustion cylinders and the two charge pumping cylinders comprising the four cylinders of each block are parallel and in the same longitudinal plane, and the axes of the four cylinders of each block intersect the axis of the crank shaft "13."

Secured to the face of the cylinder blocks "10" and "11" opposite the crank ends of the cylinders are cylinder heads "19" and "20". Recesses "21" and "22" provide a compression clearance space for the combustion cylinders "15" and "16" of each block, the said recesses extending laterally from the form which coincides with the respective combustion cylinder and include in the said clearance chamber a pair of transfer valves "23" and "24" of the poppet type, to each combustion cylinder.

Recesses "25" and "26" provide a compression clearance space for the pair of charge pumping cylinders "17" and "18" of each block, the said recesses extending laterally from the cylinder and include in each said clearance space a fresh charge inlet valve "27" and "28" of the poppet type. An inlet duct "29" of one block and "30" of the other block provides an inlet passage between the external opening "31" in the cylinder block, to the inlet ports "32" and "33", formed in the head end face of the cylinder block, over which the said compression clearance space recesses "25" and "26" extend.

Charge transfer ducts "34" and "35" are formed in each cylinder block, each transfer duct providing a passage communication between each adjacent charge pump and combustion cylinder. Formed in the head face of the cylinder blocks are ports "36" and "37", the clearance space recesses "25" and "26" of the charge pumping cylinders "17" and "18" extend over these ports also. Formed in the head face of the cylinder blocks are admission ports "38" and "39" to each combustion cylinder chamber, the compression clearance space recesses "21" and "22" of the combustion cylinders register these ports with the combustion chambers, and the charge transfer ducts "34" and "35" form the passages between the said ports "38" and "39" of a given combustion chamber and port "32" or "33" of an adjacent charge pump chamber.

Exhaust ports "40" are formed in the wall of each combustion cylinder, in a position relative to the length of the cylinder axially which will permit the said ports to be uncovered to the combustion cylinder chamber, during the time the piston within the respective combustion cylinder, is moved over crank end dead center.

A spark plug "41" or other suitable ignition means is secured in the wall of the combustion chamber clearance space "21" and "22" of each block.

A cam shaft "42" is arranged in the crank case "12" for the actuation of the poppet valves; any suitable means of driving the said cam shaft in time relation with the crankshaft "13" may be employed, which will cause each poppet valve of the different cylinders to be actuated once to each two strokes of the piston of any cylinder or one to one ratio, conventional tappets, springs, keys and the usual parts associated with the poppet valves may be employed.

The relative time duration of opening of the transfer valves to the combustion chambers are of about one-half the opening time duration relative to the rotative time of the crankshaft of the conventional four cycle engines and care should be used in designing the transfer valves and all reciprocating parts associated with the said transfer valves, as light as possible in keeping with strength and long life, to minimize the inertia force developed in opening the valve.

To provide the desired valve opening port area with a cam of moderate lobe form, of not too sharp acceleration and deceleration action, it will be found advantageous to employ two charge transfer inlet valves to each combustion chamber, dividing the desired valve area between two valves and minimizing the lift height, and where a very high crankshaft rotative speed is desired a greater number of transfer valves may be used in the combustion chamber without difficulty of manufacture, or serious complication in operation or mechanism, since there are no exhaust valves in the combustion chamber clearance space of my improved two stroke cycle internal combustion engine.

Four crank pins "43", "44", "45" and "46" are formed of the crankshaft, the crank pins first from each end of the crankshaft being relatively 180° apart, the two center crank pins being relatively 180° apart and the two center crank pins occupying a plane at right angle to the plane of the two end crank pins, one piston of one cylinder of each of the two 90° V disposed cylinder blocks is separately attached to each of the four crank pins of the crankshaft. The pair of pistons attached to any given crank pin being the pistons of a pair of V disposed cylinders, occupying the same crank pin rotative plane and of a pair of chambers in which a function of a like nature is developed, either charge pumping or combustion.

Combustion pistons "47" are arranged for reciprocatory movement within the combustion cylinders "15" and "16" and charge pumping pistons "48" are arranged for reciprocatory movement within the charge pumping cylinders "17" and "18".

It will be understood that the alternate arrangement of locating the charge pumping cylinders at the end instead of in the center, as I have shown in the accompany drawings and the combustion cylinders in the center, will accomplish substantially the same results, if the second crank pins from the ends of the crankshaft are arranged to follow instead of lead by 90° the first crank pins from each end of the crankshaft, rotatively. This alternative arrangement consists of exactly the same combination as that which I have shown in the accompanying drawings and described herein and should not be considered in any way subject matter for invention as an improvement over my invention.

The operation of my improved two stroke cycle engine is as follows, assuming the parts to be in the positions as shown in the drawings, combustion gas expansion is taking the place within the chamber of the combustion cylinder "16", the final part of a fresh charge is being admitted into the chamber of the charge pump cylinder "18", which is functionally related and adjacent to the combustion cylinder "16", the inlet valve "28", of the charge pump cylinder "18" being held open at this time by the cam of the cam shaft "42".

The piston of the charge pump cylinder "17" has on the moment reached the position of head end dead center, the piston within the combustion cylinder "15" has on the moment reached a position approximately one-half way headward through the compression stroke and the charge transfer poppet valves "23" and "24" of the combustion cylinder "15" have just seated, cutting off passage communication between the adjacent and related charge pump cylinder "17" and combustion cylinder "15".

The further rotation of the crankshaft clockwise, as indicated by the arrows in Fig. 2 for 90° will cause the piston within the combustion cylinder "15" to reach the position of head end dead center, at which time the combustion chamber will be of the least space and compression will be of maximum pressure, the timing apparatus associated with the ignition means will develop a spark and combustion will take place within the chamber of the combustion cylinder "15".

The piston within the adjacent and functionally related charge pump cylinder "17", will be in a position of approximately one-half way crankward through the suction stroke, the inlet valve "27" to this cylinder will have been opened for some time and the said charge pump cylinder will be filling with a fresh charge. The piston within the combustion cylinder "16" will be in a position of crank end dead center, the exhaust ports "40" will have been uncovered for a period of about 45° and the spent products of combustion will be released from the combustion chamber of this cylinder through the said ports, at this moment the piston within the adjacent and functionally related charge pump cylinder "18", will be in a position approximately one-half way headward through the compression stroke, the fresh charge contents of the sweep displacement of the said fresh charge pump piston will be forced out of the charge pump chamber through the transfer port "37", into the transfer duct "35" and through the transfer valved ports "38" and "39" into the chamber of the combustion cylinder "16", developing a scavenging function thereby.

Thus, I have provided means of filling four fresh charge pump chambers once for each two stroke cycle, means of scavenging four combustion chambers, once for each two stroke cycle, means of accomplishing compression and combustion within the four combustion chambers, once for each two stroke cycle, by a combination of cylinders related functionally which will permit the greatest efficiency in induction volumetric, transfer volumetric and supercharge capacity wherein poppet valves are employed as the fresh charge volume controlling members, with an arrangement of crank pins and reciprocative forces which are related in movement and of a principal which lends to the complete balancing of the rotary and reciprocatory forces by the use of counterweights of the crankshaft.

It will be understood that minor changes in the size, form and construction of the various parts of my improved engine may be made and substituted for those herein shown and described, without departing from the spirit of the invention, the scope of which is set forth in the appended claims.

I claim as my invention:

1. In an eight cylinder two stroke cycle internal combustion engine, two rows of cylinders arranged to form a V structure, the said two rows of cylinders being spaced relatively radially 90° apart, four cylinders in each row, the eight cylinders being of straight diameter, two cylinders of each row of four cylinders being adapted to charge pumping and two cylinders of each row of four cylinders being adapted to combustion, poppet type valves seated in the clearance chamber of each of the four charge pumping cylinders for the admission of fresh charge volume into the said charge pumping chambers, poppet type valves seated in the clearance chamber of each of the four combustion cylinders for the admission of fresh charge into the said combustion chambers, means of actuating the said poppet valves in two stroke cycle time and exhaust ports formed in the walls of the four combustion cylinders, the said exhaust ports to be opened and closed by the stroke movement of the pistons within the said combustion cylinders.

2. In an eight cylinder V type two stroke cycle internal combustion engine, two rows of cylinders spaced relatively 90° apart, four cylinders in each row, the bores of the eight cylinders being of one diameter, two cylinders of each row being adapted to combustion, two cylinders of each row being adapted to charge pumping, pistons arranged for reciprocatory movement within the eight cylinders, a four crank pin crank shaft, the four crank pins of the crank shaft being spaced equally apart around the rotative circle of the crank shaft, one crank pin positioned axially each 90° of the rotative plane of the crank shaft, inlet ports formed in the clearance chamber space of each of the eight cylinders, and outlet ports formed in the clearance space chambers of the four charge pumping cylinders, poppet type inlet valves seated in the said inlet ports formed in the said chambers of each of the eight cylinders, mechanical means of actuating each of the said poppet type inlet valves in cycle one to one with the crankshaft of the engine, a fresh charge supply duct leading from the exterior of each block of four cylinders to each of the inlet ports occupied by the said poppet type valves seated in the clearance chambers of the two charge pumping cylinders of each row of four cylinders, the two end cylinders of each row of four cylinders being adapted to a like function and the two center cylinders of each of the two rows of four cylinders being adapted to a like function, four separate fresh charge volume transfer ducts, one fresh charge transfer duct extending from the said outlet port formed in the clearance space chamber of each of the four charge pumping cylinders to the inlet port formed in the clearance space chamber of each of the four combustion chambers, each of the said four transfer ducts establishing passage communication between the chambers of the first and second cylinders from each end of the two rows of cylinders and each of the four transfer ducts joining the first and second cylinders from any given end of the four ends of the two rows of cylinders into a pair of functionally related adjacent pair of cylinders and the crank pin of the crankshaft to which the piston of any given charge pump cylinder is connected being 90° in advance rotatively of the crank pin of the crank shaft to which the piston within the combustion cylinder related to the given charge pumping cylinder by a transfer duct.

3. In a two-stroke cycle internal combustion engine, the combination of eight cylinders arranged to form a V structure, four cylinders arranged in a bank, two banks of four cylinders each radially spaced 90° apart, mechanically actuated poppet valved inlet ports formed in the clearance space chambers of each of the eight cylinders, four charge pumping and four combustion cylinders, two charge pumping and two combustion cylinders comprising the four cylinders of each of the two rows of V disposed cylinders, non-valved outlet ports formed in the clearance space chambers of each of the four charge pumping cylinders, a duct leading from the said outlet port of the clearance space chamber of each charge pumping cylinder to the said inlet poppet valved port of the adjacent combustion cylinder in the same row of cylinders, exhaust ports formed in the cylinder wall of each of the four combustion chambers, a four crank pin crank shaft, the crank pins spaced one each 90° of the rotative circle, the two end crank pins of the four crank pin crank shaft being spaced relatively rotatively 180° apart, the two center crank pins of the crank shaft being spaced relatively rotatively 180° apart, the four end cylinders of the two rows of cylinders being adapted to a like function and the four center cylinders of the two rows of cylinders being adapted to a like function, four cylinders adapted to charge pumping and four cylinders adapted to combustion, the eight cylinders of the two rows of cylinders being arranged into four radial pairs, each radial pair being V disposed with cylinder axes 90° apart, the axes of each of the eight cylinders intersecting the axes of the crank shaft, each radial pair of cylinders occupying the same plane as the plane of rotation of the respective one of the four crank pins of the crank shaft from a given end and the crank pin to which the pair of pistons within a given radial pair of charge pumping cylinders are connected being in advance 90° rotatively relative to the adjacent crank pin to which the pair of pistons within the adjacent functionally related radial pair of combustion cylinders are connected.

4. In a 90° V type two stroke cycle internal combustion engine, the combination four charge pumping cylinders and four combustion cylinders, two rows of cylinders, two charge pumping and two combustion cylinders in each row, a piston arranged for reciprocatory movement within each of the eight cylinders, poppet valves arranged for inlet port opening and closing actuation within the chambers of each of the four charge pumping cylinders and each of the four combustion cylinders, mechanical means of actuating the said poppet valves once for each two strokes of the piston within the respective cylinder to which they are related, the two cylinders forming each radial pair disposed relatively 90° apart being adapted to the same function, every alternate radial pair of cylinders being adapted to charge pumping, a four crank pin crank shaft, the four crank pins being spaced 90° apart, the end crank pins being spaced relatively 180° apart, the two center crank pins being spaced relatively 180° apart and the two center crank pins occupying a plane at right angle to the plane of the two end crank pins.

In testimony whereof, I have hereto affixed my signature.

EVERETT R. BURTNETT.